US012666439B2

(12) United States Patent
Jiang et al.

(10) Patent No.: US 12,666,439 B2
(45) Date of Patent: Jun. 23, 2026

(54) METHOD FOR MONITORING PHYSICAL DOWNLINK CONTROL CHANNEL, AND DEVICE

(71) Applicant: VIVO MOBILE COMMUNICATION CO., LTD., Dongguan (CN)

(72) Inventors: Dajie Jiang, Dongguan (CN); Xiaodong Shen, Dongguan (CN); Dongru Li, Dongguan (CN); Na Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 593 days.

(21) Appl. No.: 18/166,624

(22) Filed: Feb. 9, 2023

(65) Prior Publication Data

US 2023/0189291 A1     Jun. 15, 2023

Related U.S. Application Data

(63) Continuation of application No. PCT/CN2021/115771, filed on Aug. 31, 2021.

(30) Foreign Application Priority Data

Aug. 31, 2020     (CN) ......................... 202010901152.4

(51) Int. Cl.
*H04W 72/232* (2023.01)
*H04W 76/28* (2018.01)

(52) U.S. Cl.
CPC ......... *H04W 72/232* (2023.01); *H04W 76/28* (2018.02)

(58) Field of Classification Search
CPC ............... H04W 72/232; H04W 76/28; H04W 52/0216; H04W 52/0229; H04W 52/028;
(Continued)

(56) References Cited

U.S. PATENT DOCUMENTS

2019/0223164 A1     7/2019 He et al.
2020/0037396 A1 *    1/2020 Islam ................ H04W 52/0229
(Continued)

FOREIGN PATENT DOCUMENTS

CN          109429306 A     3/2019
CN          109496445 A     3/2019
(Continued)

OTHER PUBLICATIONS

Extended European Search Report for European Patent Application No. 21860584.8, dated Jan. 5, 2024.
(Continued)

*Primary Examiner* — Ayaz R Sheikh
(74) *Attorney, Agent, or Firm* — Harness, Dickey & Pierce, PLC

(57)                ABSTRACT

A method for monitoring a physical downlink control channel includes: receiving, by a terminal device, configuration information, where the configuration information includes a plurality of groups of CDRX parameters, and the plurality of groups of CDRX parameters correspond to a plurality of target objects; and monitoring, by the terminal device, according to a first group of CDRX parameters corresponding to a first object in the configuration information, a PDCCH associated with the first object. The first object is one of the plurality of target objects. The plurality of target objects include at least one of: a DCI format; an uplink grant; a downlink grant; a DCI format having a preset DCI size; a RNTI; a search space; a control resource set; or a bandwidth part.

18 Claims, 4 Drawing Sheets

A terminal device receives configuration information, where the configuration information includes a plurality of groups of connected mode discontinuous reception CDRX parameters, and the plurality of groups of CDRX parameters correspond to a plurality of target objects ~201

The terminal device monitors, according to a first group of CDRX parameters corresponding to a first object in the configuration information, a physical downlink control channel PDCCH associated with the first object, where the first object is one of the plurality of target objects, and the plurality of target objects include at least one of the following: a downlink control information DCI format; an uplink grant; a downlink grant; a DCI format having a preset DCI size; a radio network temporary identifier RNTI; a search space; a control resource set; or a bandwidth part ~203

(58) Field of Classification Search
    CPC . H04W 76/11; H04W 52/0225; H04L 1/1851;
        H04L 1/1896; H04L 1/0038; Y02D 30/70
    See application file for complete search history.

(56)                    References Cited

U.S. PATENT DOCUMENTS

| 2020/0260304 A1* | 8/2020 | Zhou | H04W 52/0235 |
|---|---|---|---|
| 2021/0144798 A1 | 5/2021 | Jiang et al. | |
| 2021/0153047 A1 | 5/2021 | Jiang et al. | |
| 2021/0176814 A1* | 6/2021 | Shi | H04W 52/0216 |
| 2021/0337471 A1 | 10/2021 | Hu et al. | |
| 2021/0345443 A1* | 11/2021 | Li | H04W 76/28 |
| 2021/0360736 A1 | 11/2021 | Chen | |
| 2022/0386408 A1 | 12/2022 | Li | |

FOREIGN PATENT DOCUMENTS

| CN | 110719635 A | 1/2020 |
|---|---|---|
| CN | 110740025 A | 1/2020 |
| CN | 110876185 A | 3/2020 |
| CN | 110945962 A | 3/2020 |
| CN | 111049630 A | 4/2020 |
| CN | 111278171 A | 6/2020 |
| WO | WO-2020034218 A1 | 2/2020 |
| WO | WO-2020069135 A2 | 4/2020 |

OTHER PUBLICATIONS

First Office Action regarding Chinese Patent Application No. 202010901152.4, dated Feb. 28, 2023. Translation provided by Bohui Intellectual Property.
First Office Action regarding Japanese Patent Application No. 2023-510410, dated Mar. 26, 2024.
International Search Report and Written Opinion of the International Searching Authority regarding International Patent Application No. PCT/CN2021/115771, dated Oct. 19, 2021. Translation provided by Bohui Intellectual Property.
"Discussion on UE power saving schemes with adaption to UE traffic," CMCC, 3GPP TSG RAN WG1 #96, R1-1903344, dated Mar. 1, 2019.
Second Office Action regarding Japanese Patent Application No. 2023-510410, dated Oct. 28, 2024. Translation provided by Bohui Intellectual Property.

* cited by examiner

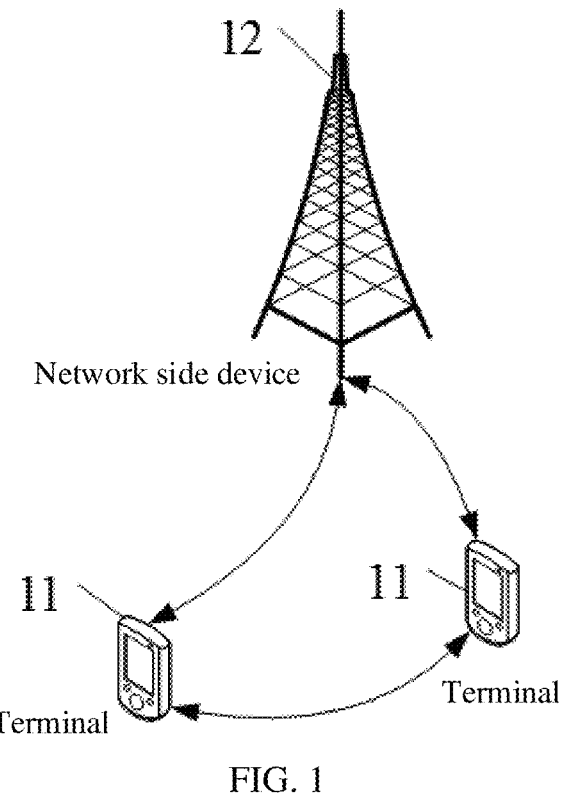

Network side device 11    11

Terminal    Terminal

FIG. 1

A terminal device receives configuration information, where the configuration information includes a plurality of groups of connected mode discontinuous reception CDRX parameters, and the plurality of groups of CDRX parameters correspond to a plurality of target objects    201

The terminal device monitors, according to a first group of CDRX parameters corresponding to a first object in the configuration information, a physical downlink control channel PDCCH associated with the first object, where the first object is one of the plurality of target objects, and the plurality of target objects include at least one of the following: a downlink control information DCI format; an uplink grant; a downlink grant; a DCI format having a preset DCI size; a radio network temporary identifier RNTI; a search space; a control resource set; or a bandwidth part    203

FIG. 2

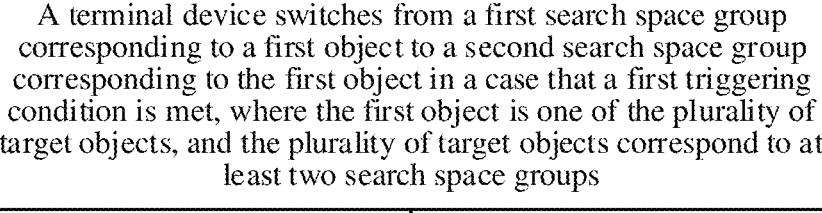

A terminal device switches from a first search space group corresponding to a first object to a second search space group corresponding to the first object in a case that a first triggering condition is met, where the first object is one of the plurality of target objects, and the plurality of target objects correspond to at least two search space groups

301

The terminal device monitors a first PDCCH associated with the first object according to the second search space group, where the plurality of target objects include at least one of the following: a downlink control information DCI format; an uplink grant; a downlink grant; a DCI format having a preset DCI size; a radio network temporary identifier RNTI; a search space; a control resource set; or a bandwidth part

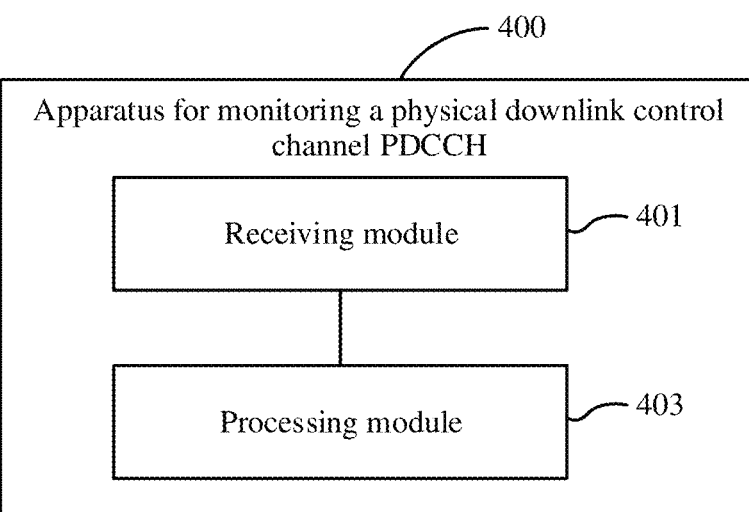

Apparatus for monitoring a physical downlink control channel PDCCH

Receiving module                401

Processing module                403

FIG. 4

METHOD FOR MONITORING PHYSICAL DOWNLINK CONTROL CHANNEL, AND DEVICE

CROSS-REFERENCE TO RELATED APPLICATIONS

This application is a Bypass Continuation Application of PCT/CN2021/115771 filed on Aug. 31, 2021, which claims priority to Chinese Patent Application No. 202010901152.4 filed on Aug. 31, 2020, which are incorporated herein by reference in their entirety.

TECHNICAL FIELD

This application relates to the field of communications, and in particular, to a method and apparatus for monitoring a physical downlink control channel, and a device.

BACKGROUND

In a mobile communication system, for example, a long term evolution (LTE) system or a new radio (NR) system, a discontinuous reception (DRX) mechanism is introduced to achieve an objective of saving power of a user equipment (UE, may be referred to as a terminal device, a user terminal, a mobile terminal, or the like) through configuring an on and off time of the DRX.

SUMMARY

According to a first aspect, a method for monitoring a physical downlink control channel is provided, including: receiving, by a terminal device, configuration information, where the configuration information includes a plurality of groups of connected mode discontinuous reception (CDRX) parameters, and the plurality of groups of CDRX parameters correspond to a plurality of target objects; and monitoring, by the terminal device, according to a first group of CDRX parameters corresponding to a first object in the configuration information, a physical downlink control channel (PDCCH) associated with the first object, where the first object is one of the plurality of target objects, and the plurality of target objects include at least one of: a downlink control information (DCI) format; an uplink grant; a downlink grant; a DCI format having a preset DCI size; a radio network temporary identifier (RNTI); a search space; a control resource set; or a bandwidth part.

According to a second aspect, an apparatus for monitoring a physical downlink control channel is provided, including: a receiving module, configured to receive configuration information, where the configuration information includes a plurality of groups of connected mode discontinuous reception (CDRX) parameters, and the plurality of groups of CDRX parameters correspond to a plurality of target objects; and a processing module, configured to monitor, according to a first group of CDRX parameters corresponding to a first object in the configuration information, a physical downlink control channel (PDCCH) associated with the first object, where the first object is one of the plurality of target objects, and the plurality of target objects include at least one of: a downlink control information (DCI) format; an uplink grant; a downlink grant; a DCI format having a preset DCI size; a radio network temporary identifier (RNTI); a search space; a control resource set; or a bandwidth part.

According to a third aspect, a method for monitoring a physical downlink control channel is provided, including: switching, by a terminal device, from a first search space group corresponding to a first object to a second search space group corresponding to the first object in a case that a first triggering condition is met, where the first object is one of the plurality of target objects, and the plurality of target objects correspond to at least two search space groups; and monitoring, by the terminal device, a first PDCCH associated with the first object according to the second search space group, where the plurality of target objects include at least one of: a downlink control information (DCI) format; an uplink grant; a downlink grant; a DCI format having a preset DCI size; a radio network temporary identifier (RNTI); a search space; a control resource set; or a bandwidth part.

According to a fourth aspect, an apparatus for monitoring a physical downlink control channel is provided, applied to a terminal device and including: a switching module, configured to switch from a first search space group corresponding to a first object to a second search space group corresponding to the first object in a case that a first triggering condition is met, where the first object is one of the plurality of target objects, and the plurality of target objects correspond to at least two search space groups; and a processing module, configured to monitor a first PDCCH associated with the first object according to the second search space group, where the plurality of target objects include at least one of: a downlink control information (DCI) format; an uplink grant; a downlink grant; a DCI format having a preset DCI size; a radio network temporary identifier (RNTI); a search space; a control resource set; or a bandwidth part.

According to a fifth aspect, a terminal device is provided, including a memory, a processor, and a program or an instruction stored in the memory and executable on the processor, where when the program or instruction is executed by the processor, steps of the method according to the first aspect or steps of the method according to the third aspect are implemented.

According to a sixth aspect, a non-transitory computer-readable storage medium is provided, storing a program or an instruction, where when the program or instruction is executed by a processor, steps of the method according to the first aspect or steps of the method according to the third aspect are implemented.

According to a seventh aspect, a computer program product is provided, including a processor, a memory, and a program or an instruction stored in the memory and executable on the processor, where when the program or instruction is executed by the processor, steps of the method according to the first aspect or steps of the method according to the third aspect are implemented.

According to an eighth aspect, a chip is provided, including a processor and a communication interface, where the communication interface is coupled to the processor, and the processor is configured to execute a program or an instruction of a terminal device to implement steps of the method according to the first aspect, or to implement steps of the method according to the third aspect.

BRIEF DESCRIPTION OF THE DRAWINGS

FIG. 1 shows a block diagram of a wireless communication system to which an embodiment of this application is applicable;

FIG. 2 is a schematic flowchart of a method for monitoring a physical downlink control channel according to an embodiment of this application;

FIG. 3 is a schematic flowchart of another method for monitoring a physical downlink control channel according to an embodiment of this application;

FIG. 4 is a schematic structural diagram of an apparatus for monitoring a physical downlink control channel according to an embodiment of this application;

DETAILED DESCRIPTION

Figure 5:
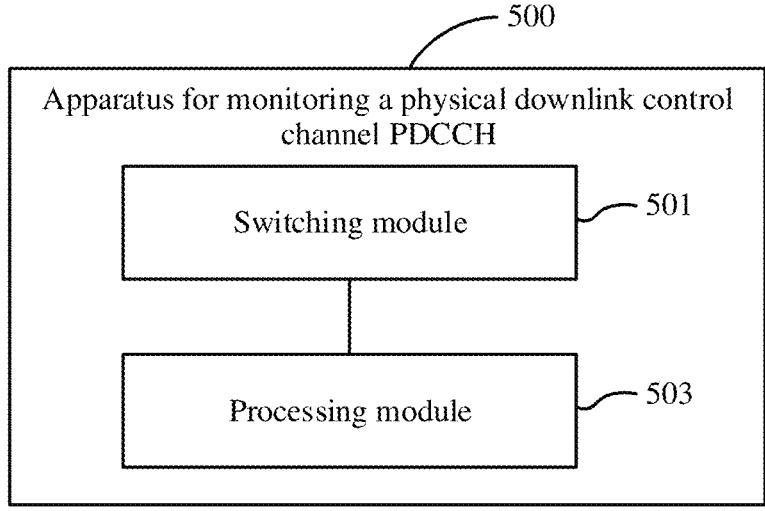
FIG. 5 is a schematic structural diagram of another apparatus for monitoring a physical downlink control channel according to an embodiment of this application.

The following clearly describes the technical solutions in embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application shall fall within the protection scope of this application.

In the specification and claims of this application, the terms "first", "second", and the like are used to distinguish similar objects, but are not used to describe a specific sequence or order. It may be understood that the data used in such a way is interchangeable in proper circumstances, so that the embodiments of this application described herein can be implemented in other sequences than the sequence illustrated or described herein, and the objects distinguished through "first" and "second" are generally of a same type and the number of the objects are not limited, for example, a first object may be one or more than one. In addition, "and/or" in this specification and the claims represents at least one of the connected objects, and a character "/" used herein indicates an "or" relationship between associated objects.

It is to be noted that the technologies described in the embodiments of this application are not limited to a long term evolution (LTE)/LTE-advanced (LTE-A) system, and may be further applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described can be applied to the systems and radio technologies mentioned above, and can also be applied to other systems and radio technologies. However, the following exemplarily describes a new radio (NR) system, and NR terms are used in most of the descriptions below. These technologies can also be applied to applications other than the NR system, for example, the 6-th generation (6G) communication system.

FIG. 1 shows a block diagram of a wireless communication system to which an embodiment of this application is applicable. The wireless communication system includes a terminal 11 and a network side device 12. The terminal 11 may also be referred to as a terminal device or a user equipment (UE), and the terminal 11 may be a terminal side device, such as a mobile phone, a tablet personal computer, a laptop computer also referred to as a notebook computer, a personal digital assistant (PDA), a handheld computer, a netbook, an ultra-mobile personal computer (UMPC), a mobile Internet device (MID), a wearable device, a vehicle user equipment (VUE), or a pedestrian user equipment (PUE). The wearable device includes: a hand ring, a headset, a pair of glasses, or the like. It is to be noted that, a type of the terminal 11 is not limited in the embodiments of this application. The network-side device 12 may be a base station or a core network, where the base station may be referred to as a node B, an evolved node B, an access point, a base transceiver station (BTS), a radio base station, a radio transceiver, a basic service set (BBS), an extended service set (ESS), a Node B, an evolved Node B (eNB), a home node B, a home evolved node B, a WLAN access point, a WiFi node, a transmitting receiving point (TRP), or an other proper term in the field as long as reaching the same technical effect. The base station is not limited to a technical word. It is to be noted that, only a base station in a NR system is taken as an example in this embodiment of this application, but a type of the base station is not limited.

A method for monitoring a physical downlink control channel according to the embodiments of this application is described below with reference to the accompany drawings through embodiments and application scenarios thereof.

Usually, during configuring the DRX, parameters such as a connected DRX-on duration timer, a connected drx-inactivity timer, a connected drx-retransmission timer, and a connected long DRX-cycle start offset will be configured. When the on-duration timer is running, or before the DRX-inactivity timer is started and does not expire, the UE will monitor a PDCCH configured by a network side device.

Therefore, how to avoid an unnecessary PDCCH blind detection to reduce power consumption of the UE becomes a technical problem to be solved urgently.

Referring to FIG. 2, an embodiment of this application provides a method for monitoring a physical downlink control channel, performed by a terminal device, where the terminal device includes a UE of an R17 version or a later version, and the method includes the following steps:

Step 201: A terminal device receives configuration information, where the configuration information includes a plurality of groups of connected mode discontinuous reception CDRX parameters, and the plurality of groups of CDRX parameters correspond to a plurality of target objects.

Optionally, the plurality of groups of CDRX parameters correspond one-to-one to the plurality of target objects, that is, each group of CDRX parameters corresponds to one target object.

Optionally, the CDRX parameters include at least one of: a CDRX-on duration timer or a CDRX-inactivity timer.

Optionally, any one of the plurality of groups of CDRX parameters includes at least one of: a CDRX-on duration timer or a CDRX-inactivity timer. That is to say, the CDRX parameters corresponding to each object of the plurality of target objects include, but is not limited to, a CDRX-on duration timer or a CDRX-inactivity timer.

Optionally, the any one of the plurality of CDRX parameters further includes at least one of: a drx-slot offset drx-Slot Offset, a drx-long cycle start offset drx-Long Cycle Start Offset, a drx-short cycle drx-Short Cycle, or a drx-short cycle timer drx-Short Cycle Timer.

Optionally, the any one of the plurality of CDRX parameters further includes at least one of: a drx-retransmission timer downlink drx-Retransmission Timer DL, a drx-retransmission timer uplink drx-Retransmission Timer UL, a drx-HARQ-round trip time-timer downlink drx-HARQ-RTT-Timer DL, or a drx-HARQ-round trip time-timer uplink drx-HARQ-RTT-Timer UL.

Step 203: The terminal device monitors, according to a first group of CDRX parameters corresponding to a first object in the configuration information, a physical downlink control channel PDCCH associated with the first object, where the first object is one of the plurality of target objects.

The plurality of target objects include at least one of the following.

(1) A downlink control information (DCI) format.

Optionally, the DCI format belongs to a corresponding DCI set, where the DCI set includes at least one DCI format.

(2) An uplink grant.

Optionally, the uplink grant belongs to a corresponding uplink grant set, where the uplink grant set includes at least one uplink grant.

Optionally, a DCI format corresponding to the uplink grant includes, but is not limited to, at least one of: a DCI format 0_1, a DCI format 0_2, or a DCI format 0_0.

(3) A downlink grant.

Optionally, the downlink grant belongs to a corresponding downlink grant set, where the downlink grant set includes at least one downlink grant.

Optionally, a DCI format corresponding to the downlink grant includes at least one of: a DCI format 1_1, a DCI format 1_2, or a DCI format 1_0.

(4) A DCI format having a preset DCI size.

Optionally, the DCI format having a preset DCI size belongs to a corresponding set of DCI formats having preset DCI sizes, where the set of DCI formats having preset DCI sizes includes at least one DCI format.

(5) A radio network temporary identifier (RNTI).

Optionally, the RNTI belongs to a corresponding RNTI set, where the RNTI set includes at least one RNTI, such as a cell RNTI, a configured scheduling RNTI (CS-RNTI), a paging RNTI, a random access RNTI (RA-RNTI), a temporary cell RNTI (TC-RNTI), an interruption RNTI (INT-RNTI), a slot format indication RNTI (SFI-RNTI), a transmit power control (TPC) of PUSCH RNTI (TPC-PUSCH-RNTI), or a semi-persistent RNTI (SP-RNTI).

(6) A search space (SS).

Optionally, the SS belongs to a corresponding SS set, where the SS set includes at least one SS.

(7) A control resource set (CORESET).

Optionally, the CORESET belongs to a corresponding CORESET set, where the CORESET set includes at least one CORESET, for example, CORESET #0, or the like.

(8) A bandwidth part (BWP).

Optionally, the BWP belongs to a corresponding BWP set, where the BWP set includes at least one BWP.

Optionally, in the method for monitoring a physical downlink control channel according to this embodiment of this application, the foregoing first object includes two or more than two of the foregoing (1) to (8).

It is to be noted that, for the terminal device, at least two CDRX processes are configured respectively for at least two (groups of) DCI formats, where at least one parameter has a different value in the two CDRX processes; at least two CDRX processes are configured respectively for at least two (groups of) RNTIs, where at least one parameter has a different value in the two CDRX processes; at least two CDRX processes are configured respectively for at least two (groups of) search spaces, where at least one parameter has a different value in the two CDRX processes; at least two CDRX processes are configured respectively for at least two (groups of) CORESETs, where at least one parameter has a different value in the two CDRX processes; and at least two CDRX processes are configured respectively for at least two (groups of) BWPs, where at least one parameter has a different value in the two CDRX processes.

In the embodiments of this application, based on the received configuration information, different connected mode discontinuous reception DRX parameters set for different objects may be obtained, that is, a corresponding relationship between the plurality of groups of CDRX parameters and the plurality of target objects may be indicated through the configuration information, where the plurality of target objects may be different objects of a same type or different objects of different types, so that the associated PDCCH may be monitored according to the CDRX parameters corresponding to the different objects respectively. In this way, the PDCCHs associated with different objects may be monitored based on different CDRX parameter configurations according to different monitoring modes to avoid unnecessary PDCCH blind detection and avoid wasting electricity by the terminal device, so as to reduce power consumption of the terminal.

Optionally, in the method for monitoring a physical downlink control channel according to this embodiment of this application, the following contents may be further included: the terminal device starts or restarts a CDRX-inactivity timer corresponding to the first object in a case that a newly transmitted PDCCH associated with the first object is received during running of a CDRX-on duration timer corresponding to the first object. That is to say, the CDRX-inactivity timer corresponding to the first object is started or restarted only when meeting a condition that the newly transmitted PDCCH associated with the first object is received during running of the CDRX-on duration timer corresponding to the first object.

It is to be noted that, the foregoing "newly transmitted" may refer to "initially transmitted" or "first-time transmitted"; and the foregoing newly transmitted PDCCH associated with the first object is relative to a retransmitted or non-first-time transmitted PDCCH.

Optionally, in the method for monitoring a physical downlink control channel according to this embodiment of this application, the following contents may be further included: the terminal device skips starting or restarting the CDRX-inactivity timer corresponding to the first object in a case that a PDCCH different from the PDCCH associated with the first object is received during running of the CDRX-on duration timer corresponding to the first object.

Optionally, in the method for monitoring a physical downlink control channel according to this embodiment of this application, the following contents may be further included: the terminal device continues to run the CDRX-inactivity timer corresponding to the first object in a case that the PDCCH associated with the first object is not received within a target time unit during running of the CDRX-inactivity timer corresponding to the first object.

Optionally, the foregoing target time unit may include a slot, one millisecond, or the like.

Optionally, if a target signaling corresponding to the first object is received, the CDRX-inactivity timer corresponding to the first object is stopped, and the CDRX-on duration timer corresponding to the first object is stopped, where the target signaling corresponding to the first object is a DRX Command MAC control element (CE), a Long DRX Command MAC CE, or a signaling of another type.

Or, if a target signaling is received, CDRX-inactivity timers corresponding to all objects are stopped, and CDRX-on duration timers corresponding to the all objects are stopped, where the target signaling is a DRX Command MAC CE, a Long DRX Command MAC CE, or a signaling of another type.

The scheme that the PDCCHs associated with different objects are monitored based on different CDRX parameter configurations according to different monitoring modes in this embodiment of this application is described below with reference to different examples. A basic idea of the scheme in this embodiment of this application is that for each cell group (CG), such as a master cell group (MCG) or a secondary cell group (SCG), the terminal device (for example, UE) has two sets of CDRX parameters, that is, two sets of DRX-inactivity timers and on duration timers, respectively corresponding to at least two (groups of) objects, for example, DCI formats. Each (group of) object has its own parameter value respectively, and the two sets of parameters run independently.

In an example 1, the CDRX parameters, that is, the DRX-inactivity timer and the on duration timer, have their own parameters for the DCI format 0_1 and the DCI format 1_1. That is, a first object and a second object are different DCI formats. For example:

(1) DRX-inactivity timer for DCI format 0_1.

(2) On duration timer for DCI format 0_1.

(3) DRX-inactivity timer for DCI format 1_1.

(4) On duration timer for DCI format 1_1.

(5) Other CDRX parameters are the same as standard CDRX parameters in a 3GPP Release 15 (R15) or Release 16 (R16).

For the DCI format 0_1, the UE detects the DCI format 0_1 during running of the on duration timer for DCI format 0_1; the UE does not detect the DCI format 0_1 during a DRX off period; the DRX-inactivity timer for DCI format 0_1 is started or restarted when the DCI format 0_1 is detected; the DRX-inactivity timer for DCI format 0_1 is not started or restarted when another DCI format (a DCI format other than the DCI format 0_1) is detected; the DRX-inactivity timer for DCI format 0_1 is reduced one when the DCI format 0_1 is not detected within a slot (the target time unit); the UE enters a DRX-off corresponding to the DCI format 0_1, when the DRX-inactivity timer for DCI format 0_1 expires, and the on duration timer for DCI format 0_1 is not running; and in this case, the UE does not detect the DCI format 0_1.

For the DCI format 1_1, the UE detects the DCI format 1_1 during running of the on duration timer for DCI format 1_1; the UE does not detect the DCI format 1_1 during a DRX off period; the DRX-inactivity timer for DCI format 1_1 is started or restarted when the DCI format 1_1 is detected; the DRX-inactivity timer for DCI format 1_1 is not started or restarted when another DCI format (a DCI format other than the DCI format 1_1) is detected; the DRX-inactivity timer for DCI format 1_1 is reduced one when the DCI format 1_1 is not detected within a slot (the target time unit); the UE enters a DRX-off corresponding to the DCI format 1_1, when the DRX-inactivity timer for DCI format 1_1 expires, and the on duration timer for DCI format 1_1 is not running; and in this case, the UE does not detect the DCI format 1_1.

In an example 2, the CDRX parameters, that is, the DRX-inactivity timer and the on duration timer, have their own parameters for the DCI format 0_1 and the DCI format 1_1. That is, a first object and a second object are different DCI formats, and there is only one on duration timer. For example:

(1) DRX-inactivity timer for DCI format 0_1.

(2) DRX-inactivity timer for DCI format 1_1.

(3) Other CDRX parameters are the same as CDRX parameters of R15 or R16.

For the DCI format 0_1, the UE detects PDCCH DCI format 0_1 within a time of the on duration timer; the DRX-inactivity timer for DCI format 0_1 is started or restarted when the DCI format 0_1 is detected; the DRX-inactivity timer for DCI format 0_1 is not started or restarted when another DCI format (a DCI format other than the DCI format 0_1) is detected; the DRX-inactivity timer is reduced one when the DCI format 0_1 is not detected within a slot; the UE enters a DRX-off corresponding to the DCI format 0_1, when the DRX-inactivity timer for DCI format 0_1 expires, and the on duration timer is not running; and in this case, the UE does not detect the DCI format 0_1.

For the DCI format 1_1, the UE detects PDCCH DCI format 1_1 within a time of the on duration timer; the DRX-inactivity timer for DCI format 1_1 is started or restarted when the DCI format 1_1 is detected; the DRX-inactivity timer for DCI format 1_1 is not started or restarted when another DCI format (a DCI format other than the DCI format 1_1) is detected; the DRX-inactivity timer is reduced one when the DCI format 1_1 is not detected within a slot; the UE enters a DRX-off corresponding to the DCI format 1_1, when the DRX-inactivity timer for DCI format 1_1 expires, and the on duration timer is not running; and in this case, the UE does not detect the DCI format 1_1.

In an example 3, the CDRX parameters, that is, the DRX-inactivity timer and the on duration timer, have their own parameters for the DCI format 0_1 and the DCI format 1_1. That is, a first object and a second object are different DCI formats, and there is only one DRX-inactivity timer. For example:

(1) On duration timer for DCI format 0_1.

(2) On duration timer for DCI format 1_1.

(3) Other CDRX parameters are the same as CDRX parameters of R15 or R16.

The UE detects the DCI format 0_1 within a time of the on duration timer for DCI format 0_1; the UE detects the DCI format 1_1 within a time of the on duration timer for DCI format 1_1; the DRX-inactivity timer is started or restarted when the DCI format 0_1 or the DCI format 1_1 is detected; the UE enters a DRX-off corresponding to the DCI format 0_1, when the DRX-inactivity timer expires, and the on duration timer for DCI format 0_1 is not running; in this case, the UE does not detect the DCI format 0_1; the UE enters a DRX-off corresponding to the DCI format 1_1, when the DRX-inactivity timer expires, and the on duration timer for DCI format 1_1 is not running; and in this case, the UE does not detect the DCI format 1_1.

In an example 4, the CDRX parameters, that is, the DRX-inactivity timer and the on duration timer, have their own parameters for the uplink (UL) grant and the downlink (DL) grant. That is, a first object and a second object are different UL grants or DL grants. For example:

(1) DRX-inactivity timer for UL grant, where the UL grant includes at least one DCI format scheduling uplink, such as a DCI format 0_1, a DCI format 0_2, or a DCI format 0_0.

(2) On duration timer for UL grant, where the UL grant includes at least one DCI format scheduling downlink, such as a DCI format 0_1, a DCI format 0_2, or a DCI format 0_0.

(3) DRX-inactivity timer for DL grant, where the DL grant includes at least one DCI format of a DCI format 1_1, a DCI format 1_2, or a DCI format 1_0.

(4) On duration timer for DL grant, where the DL grant includes at least one DCI format of a DCI format 1_1, a DCI format 1_2, or a DCI format 1_0.

(5) Other CDRX parameters are the same as CDRX parameters of R15 or R16.

For the UL grant, the UE detects the UL grant during running of the on duration timer for UL grant; the UE does not detect the UL grant during a DRX off period (a time in a DRX cycle other than the on duration timer for UL grant); the DRX-inactivity timer for UL grant is started or restarted when the UL grant is detected; the DRX-inactivity timer for UL grant is not started or restarted when another DCI format (not the UL grant) is detected; the DRX-inactivity timer for UL grant is reduced one when the UL grant is not detected within a slot; the UE enters a DRX-off corresponding to the UL grant, when the DRX-inactivity timer for UL grant expires, and the on duration timer for UL grant is not running; and in this case, the UE does not detect the UL grant.

For the DL grant, the UE detects the DL grant during running of the on duration timer for DL grant; the UE does not detect the DL grant during a DRX off period (a time in a DRX cycle other than the on duration timer for DL grant); the DRX-inactivity timer for DL grant is started or restarted when the DL grant is detected; the DRX-inactivity timer for DL grant is not started or restarted when another DCI format (not the DL grant) is detected; the DRX-inactivity timer for DL grant is reduced one when the DL grant is not detected within a slot; the UE enters a DRX-off corresponding to the DL grant, when the DRX-inactivity timer for DL grant expires, and the on duration timer for DL grant is not running; and in this case, the UE does not detect the DL grant.

In an example 5, the CDRX parameters, that is, the DRX-inactivity timer and the on duration timer, have their own parameters for the UL grant and the DL grant. That is, a first object and a second object are different UL grants or DL grants, and there is only one on duration timer. For example:

(1) DRX-inactivity timer for UL grant, where the UL grant includes at least one DCI format scheduling uplink, such as a DCI format 0_1, a DCI format 0_2, or a DCI format 0_0.

(2) DRX-inactivity timer for DL grant, where the DL grant includes at least one DCI format of a DCI format 1_1, a DCI format 1_2, or a DCI format 1_0.

(3) Other CDRX parameters are the same as CDRX parameters of R15 or R16.

For the UL grant, the UE detects the UL grant during running of the on duration timer for UL grant; the DRX-inactivity timer for UL grant is started or restarted when the UL grant is detected; the DRX-inactivity timer for UL grant is not started or restarted when another DCI format (not a DCI format of the UL grant) is detected; the DRX-inactivity timer for UL grant is reduced one when the UL grant is not detected within a slot; the UE enters a DRX-off corresponding to the UL grant, when the DRX-inactivity timer for UL grant expires, and the on duration timer is not running; and in this case, the UE does not detect the UL grant.

For the DL grant, the UE detects the DL grant during running of the on duration timer for DL grant; the DRX-inactivity timer for DL grant is started or restarted when the DL grant is detected; the DRX-inactivity timer for DL grant is not started or restarted when another DCI format (not a DCI format of the DL grant) is detected; the DRX-inactivity timer for DL grant is reduced one when the DL grant is not detected within a slot; the UE enters a DRX-off corresponding to the DL grant, when the DRX-inactivity timer for DL grant expires, and the on duration timer is not running; and in this case, the UE does not detect the DL grant.

In an example 6, the CDRX parameters, that is, the DRX-inactivity timer and the on duration timer, have their own parameters for the UL grant and the DL grant. That is, a first object and a second object are different UL grants or DL grants, and there is only one DRX-inactivity timer. For example:

(1) On duration timer for UL grant, where the UL grant includes at least one DCI format scheduling uplink, such as a DCI format 0_1, a DCI format 0_2, or a DCI format 0_0.

(2) On duration timer for DL grant, where the DL grant includes at least one DCI format of a DCI format 1_1, a DCI format 1_2, or a DCI format 1_0.

(3) Other CDRX parameters are the same as CDRX parameters of R15 or R16.

The UE detects the UL grant within a time of the on duration timer for UL grant; the UE detects the DL grant within a time of the on duration timer for DL grant; the DRX-inactivity timer is started or restarted when the UL grant or the DL grant is detected; the UE enters a DRX-off corresponding to the UL grant, when the DRX-inactivity timer expires, and the on duration timer for UL grant is not running; in this case, the UE does not detect the UL grant; the UE enters a DRX-off corresponding to the DL grant, when the DRX-inactivity timer expires, and the on duration timer for DL grant is not running; and in this case, the UE does not detect the DL grant.

In an example 7, the CDRX parameters, that is, the DRX-inactivity timer and the on duration timer, have their own parameters for the DCI formats with different DCI sizes. That is, a first object and a second object are different DCI formats with different DCI sizes. For example:

(1) DRX-inactivity timer for DCI size 1, where the DCI formats with a DCI size equal to the DCI size 1 include a DCI format 0_0, and a DCI format 1_0.

(2) DRX-on duration timer for DCI size 1, where the DCI formats with a DCI size equal to the DCI size 1 include a DCI format 0_0, and a DCI format 1_0.

(3) DRX-inactivity timer for DCI size 2, where the DCI formats with a DCI size equal to the DCI size 2 include a DCI format 0_1.

(4) DRX-on duration timer for DCI size 2, where the DCI formats with a DCI size equal to the DCI size 2 include a DCI format 0_1.

(5) DRX-inactivity timer for DCI size 3, where the DCI formats with a DCI size equal to the DCI size 3 include a DCI format 1_1.

(6) DRX-on duration timer for DCI size 3, where the DCI formats with a DCI size equal to the DCI size 3 include a DCI format 1_1.

(7) Other CDRX parameters are the same as CDRX parameters of R15 or R16.

For the DCI size 1, the UE detects a target DCI format during running of the on duration timer for DCI size 1, where the target DCI format includes the DCI formats with a DCI size equal to the DCI size 1 including a DCI format 0_0, and a DCI format 1_0; the UE does not detect the target DCI format during a DRX off period (a time in a DRX cycle other than the on duration timer for DCI size 1); the DRX-inactivity timer for DCI size 1 is started or restarted when the target DCI format is detected; the DRX-inactivity timer for DCI size 1 is not started or restarted when another DCI format (not the target DCI format) is detected; the DRX-inactivity timer for DCI size 1 is reduced one when the target DCI format is not detected within a slot; the UE enters a DRX-off corresponding to the DCI size 1, when the DRX-inactivity timer for DCI size 1 expires, and the on duration timer for DCI size 1 is not running; and in this case, the UE does not detect the target DCI format.

Procedures of corresponding parameters of the DCI size 2 and the DCI size 3 are the same as those of the DCI size 1, and details are not described herein again.

In an example 8, the CDRX parameters, that is, the DRX-inactivity timer and the on duration timer, have their own parameters for the DCI formats with different DCI sizes. That is, a first object and a second object are different DCI formats with different DCI sizes, and there is only one on duration timer. For example:

(1) DRX-inactivity timer for DCI size 1, where the DCI formats with a DCI size equal to the DCI size 1 include a DCI format 0_0, and a DCI format 1_0.

(2) DRX-inactivity timer for DCI size 2, where the DCI formats with a DCI size equal to the DCI size 2 include a DCI format 0_1.

(3) DRX-inactivity timer for DCI size 3, where the DCI formats with a DCI size equal to the DCI size 3 include a DCI format 1_1.

(4) Other CDRX parameters are the same as CDRX parameters of R15 or R16.

For the DCI size 1, the UE detects the base-station-configured DCI formats with different DCI sizes during running of the on duration timer; the DRX-inactivity timer for DCI size 1 is started or restarted when a target DCI format is detected, where the target DCI format includes the DCI formats with a DCI size equal to the DCI size 1, including the DCI format 0_0 and the DCI format 1_0; the DRX-inactivity timer for DCI size 1 is not started or restarted when another DCI format (not the target DCI format) is detected; the DRX-inactivity timer for DCI size 1 is reduced one when the target DCI format is not detected within a slot; the UE enters a DRX-off corresponding to the DCI size 1, when the DRX-inactivity timer for DCI size 1 expires, and the on duration timer is not running; and in this case, the UE does not detect the target DCI format.

Procedures of corresponding parameters of the DCI size 2 and the DCI size 3 are the same as those of the DCI size 1, and details are not described herein again.

In an example 9, the CDRX parameters, that is, the DRX-inactivity timer and the on duration timer, have their own parameters for the DCI formats with different DCI sizes. That is, a first object and a second object are different DCI formats with different DCI sizes, and there is only one DRX-inactivity timer. For example:

(1) DRX-on duration timer for DCI size 1, where the DCI formats with a DCI size equal to the DCI size 1 include a DCI format 0_0, and a DCI format 1_0.

(2) DRX-on duration timer for DCI size 2, where the DCI formats with a DCI size equal to the DCI size 2 include a DCI format 0_1.

(3) DRX-on duration timer for DCI size 3, where the DCI formats with a DCI size equal to the DCI size 3 include a DCI format 1_1.

(4) Other CDRX parameters are the same as CDRX parameters of R15 or R16.

the UE detects a first target DCI format within a time of the on duration timer for DCI size 1, where the first target DCI format includes the DCI formats with a DCI size equal to the DCI size 1 including the DCI format 0_0, and the DCI format 1_0; the UE detects a second target DCI format within a time of the on duration timer for DCI size 2, where the second target DCI format includes the DCI formats with a DCI size equal to the DCI size 2 including a DCI format 0_1; the UE detects a third target DCI format within a time of the on duration timer for DCI size 3, where the third target DCI format includes the DCI formats with a DCI size equal to the DCI size 3 including a DCI format 1_1; the DRX-inactivity timer is started or restarted when the first, second, or third target DCI format is detected; the UE enters a DRX-off corresponding to the first target DCI format, when the DRX-inactivity timer expires, and the on duration timer for DCI size 1 is not running; and in this case, the UE does not detect the first target DCI format. The UE enters a DRX-off corresponding to the second target DCI format, when the DRX-inactivity timer expires, and the on duration timer for DCI size 2 is not running; and in this case, the UE does not detect the second target DCI format. The UE enters a DRX-off corresponding to the third target DCI format, when the DRX-inactivity timer expires, and the on duration timer for DCI size 3 is not running; and in this case, the UE does not detect the third target DCI format.

In an example 10, the CDRX parameters, that is, the DRX-inactivity timer and the on duration timer, have their own parameters for different BWPs. For example, a first object and a second object are a BWP 1 and a BWP 2.

(1) DRX-inactivity timer for BWP 1.

(2) On duration timer for BWP 1.

(3) DRX-inactivity timer for BWP 2.

(4) On duration timer for BWP 2.

(5) Other CDRX parameters are the same as CDRX parameters of R15 or R16.

For the BWP 1, the UE detects the BWP 1 during running of the on duration timer for BWP 1; the UE does not detect the BWP 1 during a DRX off period; the DRX-inactivity timer for BWP 1 is started or restarted when the BWP 1 is detected; the DRX-inactivity timer for BWP 1 is not started or restarted when another BWP (not BWP 1) is detected; the DRX-inactivity timer for BWP 1 is reduced one when the BWP 1 is not detected within a slot (the target time unit); the UE enters a DRX-off corresponding to the BWP 1, when the DRX-inactivity timer for BWP 1 expires, and the on duration timer for BWP 1 is not running; and in this case, the UE does not detect the BWP 1.

For the BWP 2, the UE detects the BWP 2 during running of the on duration timer for BWP 2; the UE does not detect the BWP 2 during a DRX off period; the DRX-inactivity timer for BWP 2 is started or restarted when the BWP 2 is detected; the DRX-inactivity timer for BWP 2 is not started or restarted when another BWP (not BWP 2) is detected; the DRX-inactivity timer for BWP 2 is reduced one when the BWP 2 is not detected within a slot (the target time unit); the UE enters a DRX-off corresponding to the BWP 2, when the DRX-inactivity timer for BWP 2 expires, and the on duration timer for BWP 2 is not running; and in this case, the UE does not detect the BWP 2.

In an example 11, the CDRX parameters, that is, the DRX-inactivity timer and the on duration timer, have their own parameters for different BWPs. For example, a first object and a second object are a BWP 1 and a BWP 2, and there is only one on duration timer.

(1) DRX-inactivity timer for BWP 1.

(2) DRX-inactivity timer for BWP 2.

(3) Other CDRX parameters are the same as CDRX parameters of R15 or R16.

For the BWP 1, the UE detects PDCCH BWP 1 within a time of the on duration timer; the DRX-inactivity timer for BWP 1 is started or restarted when the BWP 1 is detected;

the DRX-inactivity timer for BWP 1 is not started or restarted when another BWP (not BWP 1) is detected; the DRX-inactivity timer is reduced one when the BWP 1 is not detected within a slot; the UE enters a DRX-off corresponding to the BWP 1, when the DRX-inactivity timer for BWP 1 expires, and the on duration timer is not running; and in this case, the UE does not detect the BWP 1.

For the BWP 2, the UE detects PDCCH BWP 2 within a time of the on duration timer; the DRX-inactivity timer for BWP 2 is started or restarted when the BWP 2 is detected; the DRX-inactivity timer for BWP 2 is not started or restarted when another BWP (not BWP 2) is detected; the DRX-inactivity timer is reduced one when the BWP 2 is not detected within a slot; the UE enters a DRX-off corresponding to the BWP 2, when the DRX-inactivity timer for BWP 2 expires, and the on duration timer is not running; and in this case, the UE does not detect the BWP 2.

In an example 12, the CDRX parameters, that is, the DRX-inactivity timer and the on duration timer, have their own parameters for different BWPs. For example, a first object and a second object are a BWP 1 and a BWP 2, and there is only one DRX-inactivity timer.

(1) On duration timer for BWP 1.

(2) On duration timer for BWP 2.

(3) Other CDRX parameters are the same as CDRX parameters of R15 or R16.

The UE detects the BWP 1 within a time of the on duration timer for BWP 1; the UE detects the BWP 2 within a time of the on duration timer for BWP 2; the DRX-inactivity timer is started or restarted when the BWP 1 or the BWP 2 is detected; the UE enters a DRX-off corresponding to the BWP 1, when the DRX-inactivity timer expires, and the on duration timer for BWP 1 is not running; in this case, the UE does not detect the BWP 1; the UE enters a DRX-off corresponding to the BWP 2, when the DRX-inactivity timer expires, and the on duration timer for BWP 2 is not running; and in this case, the UE does not detect the BWP 2.

Parameter-related procedures corresponding to objects such as the RNTI set, the SS set, and the CORESET set are similar to those corresponding to the DCI format, the DCI format set having a certain DCI size, the UL grant set, the DL grant set, the BWP set, and the like in the foregoing different examples, and details are not described herein again.

In conclusion, in this embodiment of this application, through setting different CDRX parameters, for example, different DRX-inactivity timers and on duration timers, for different DCI formats (or other objects), the UE monitors different DCI formats according to different monitoring modes (for example, a DRX-inactivity timer mechanism according to different parameter values), which can avoid unnecessary PDCCH blind detection, especially when different DCI formats have different DCI sizes, so as to save electricity.

Optionally, in the method for monitoring a physical downlink control channel according to this embodiment of this application, the following contents may be further included: the terminal device determines to enter a DRX inactive period corresponding to the first object in a case that the CDRX-on duration timer corresponding to the first object is not running and the CDRX-inactivity timer corresponding to the first object expires.

Optionally, in the method for monitoring a physical downlink control channel according to this embodiment of this application, the following contents may be further included: the terminal device determines to enter a DRX active period in a case that a CDRX-on duration timer or CDRX-inactivity timer corresponding to any one of the target objects is started.

Optionally, in the method for monitoring a physical downlink control channel according to this embodiment of this application, before the foregoing step 203, the following contents may be further included: the terminal device receives a wake-up signal (WUS), where the wake-up signal is used for indicating one of the following.

(1) Whether to monitor a PDCCH during running of all CDRX-on duration timers corresponding to the plurality of groups of CDRX parameters, where the wake-up signal is associated with the plurality of groups of CDRX parameters. That is to say, a behavior of monitoring the PDCCH associated with the plurality of target objects corresponding to the plurality of groups of CDRX parameters may be indicated simultaneously through the wake-up signal.

In an example, the WUS indicates whether the UE detects or skips detecting the PDCCH during running of all the on duration timers (such as an on duration timer for DCI format 0_1 and an on duration timer for DCI format 1_1).

(2) Whether to monitor a PDCCH during running of a CDRX-on duration timer corresponding to a first group of CDRX parameters in the plurality of groups of CDRX parameters, where the wake-up signal is associated with the first group of CDRX parameters. That is to say, a behavior of monitoring the PDCCH associated with a specified object in the plurality of target objects corresponding to the plurality of groups of CDRX parameters may be indicated through the wake-up signal.

In an example, the WUS indicates whether the UE detects or skips detecting the PDCCH during running of different on duration timers (such as an on duration timer for DCI format 0_1 and an on duration timer for DCI format 1_1) respectively; for example, DCI of the WUS includes at least two bits, respectively indicating whether one UE detects or skips detecting the PDCCH during running of the on duration timer for DCI format 0_1 and the on duration timer for DCI format 1_1.

Optionally, in the method for monitoring a physical downlink control channel according to this embodiment of this application, the following contents may be further included: the terminal device switches from a first search space group corresponding to a first object to a second search space group corresponding to the first object in a case that a first triggering condition is met, where the plurality of target objects correspond to at least two search space groups; and the terminal device monitors a first PDCCH associated with the first object according to the second search space group.

In this embodiment of this application, through setting at least two different search space groups for any one of different objects, for example, at least setting the first search space group and the second search space group for the first object in the plurality of the target objects, where the plurality of target objects may be different objects of a same type or different objects of different types, and then switching may be performed from monitoring a first PDCCH associated with the first object according to the first search space group corresponding to the first object to monitoring the first PDCCH associated with the first object according to the second search space group corresponding to the first object in a case that a preset condition, that is, the first triggering condition, is met. In this way, the PDCCHs associated with different objects may be monitored based on at least two different search space group configurations respectively corresponding to different objects to avoid unnecessary PDCCH blind detection and avoid wasting electricity by the terminal device, so as to reduce power consumption of the terminal.

Optionally, in the method for monitoring a physical downlink control channel according to this embodiment of this application, the foregoing first triggering condition includes one of the following:

(1) The first PDCCH being received. The scheme of switching a search space group corresponding to the first object when a first PDCCH is received may be understood as that the switching of the search space group corresponding to the first object is implicitly triggered through receiving the first PDCCH.

(2) A target PDCCH being received, where DCI of the target PDCCH carries a bit indicating that the terminal device switches from the first search space group to the second search space group. The scheme of switching a search space group corresponding to the first object when a target PDCCH carrying DCI indicating that the terminal device switches a search space group corresponding to the first object is received may be understood as that the switching of the search space group corresponding to the first object is explicitly triggered through the foregoing DCI carried in the target PDCCH.

(3) A first timer expiring, where the first timer is started after the first search space group takes effect, the first timer is restarted in a case that the first PDCCH is received, and the first timer continues to run in a case that the first PDCCH is not received.

The following description is made with an example that the terminal device UE maintaining the following parameters: the first object is a DCI format 0_1, the corresponding first search space group is an SS group 1, and the second search space group is an SS group 2; and the second object is a DCI format 1_1, the corresponding first search space group is an SS group 1, and the second search space group is an SS group 2. Then a triggering condition for switching different SS groups may be as follows.

In an example, when receiving a specified DCI format, for example, a DCI format 0_1, the UE switches from an SS group 1 for DCI format 0_1 to an SS group 2 for DCI format 0_1 (that is, in this case, the SS group 1 may be stopped, and the SS group 2 may be activated), where the SS group 1 for DCI format 0_1 and the SS group 2 for DCI format 0_1 may be preconfigured by a network side device (for example, a base station). When receiving a specified DCI format, for example, a DCI format 1_1, the UE switches from an SS group 1 for DCI format 1_1 to an SS group 2 for DCI format 1_1 (that is, in this case, the SS group 1 may be stopped, and the SS group 2 may be activated), where the SS group 1 for DCI format 1_1 and the SS group 2 for DCI format 1_1 may be preconfigured by a network side device (for example, a base station).

In another example, after the UE switches to the SS group 2 for DCI format 0_1, a timer 1 is started and counted down, and the timer 1 counts once (the timer 1 is reduced one) when the DCI format in a specified format, for example, the DCI format 0_1, is not received; the timer 1 is restarted when the DCI format in a specified format, for example, the DCI format 0_1, is received; and the UE switches to the SS group 1 for DCI format 0_1 when the timer 1 expires. After the UE switches to the SS group 2 for DCI format 1_1, a timer 2 is started and counted down, and the timer 2 counts once (the timer 2 is reduced one) when the DCI format in a specified format, for example, the DCI format 1_1, is not received; the timer 2 is restarted when the DCI format in a specified format, for example, the DCI format 1_1, is received; and the UE switches to the SS group 1 for DCI format 1_1 when the timer 2 expires.

Optionally, in the method for monitoring a physical downlink control channel according to this embodiment of this application, the following contents may be further included:

in a case that the first triggering condition is met, the terminal device stops monitoring the first PDCCH according to the first search space group. That is to say, in a case that the first triggering condition is met, the first PDCCH is no longer monitored according to the first search space group corresponding to the first object.

Referring to FIG. 3, an embodiment of this application provides a method for monitoring a physical downlink control channel, performed by a terminal device, where the terminal device includes a UE of an R17 version or a later version, and the method includes the following steps.

Step 301: A terminal device switches from a first search space group corresponding to a first object to a second search space group corresponding to the first object in a case that a first triggering condition is met, where the first object is one of the plurality of target objects, and the plurality of target objects correspond to at least two search space groups.

Optionally, that the plurality of target objects correspond to at least two search space groups may be understood as that each object in the plurality of target objects corresponds to at least two search space groups.

Step 303: The terminal device monitors a first PDCCH associated with the first object according to the second search space group.

The plurality of target objects include at least one of the following.

(1) A downlink control information DCI format.

Optionally, the DCI format belongs to a corresponding DCI set, where the DCI set includes at least one DCI format.

(2) An uplink grant.

Optionally, the uplink grant belongs to a corresponding uplink grant set, where the uplink grant set includes at least one uplink grant.

Optionally, a DCI format corresponding to the uplink grant includes, but is not limited to, at least one of: a DCI format 0_1, a DCI format 0_2, or a DCI format 0_0.

(3) A downlink grant.

Optionally, the downlink grant belongs to a corresponding downlink grant set, where the downlink grant set includes at least one downlink grant.

Optionally, a DCI format corresponding to the downlink grant includes at least one of: a DCI format 1_1, a DCI format 1_2, or a DCI format 1_0.

(4) A DCI format having a preset DCI size.

Optionally, the DCI format having a preset DCI size belongs to a corresponding set of DCI formats having preset DCI sizes, where the set of DCI formats having preset DCI sizes includes at least one DCI format.

(5) A radio network temporary identifier RNTI.

Optionally, the RNTI belongs to a corresponding RNTI set, where the RNTI set includes at least one RNTI, such as a cell RNTI, a configured scheduling RNTI, a paging RNTI, a random access RNTI, a temporary cell RNTI, an interrupted transmission RNTI, a slot format indicator RNTI, a transmit power control of PUSCH RNTI, or a semi-persistent RNTI.

(6) A search space SS.

Optionally, the SS belongs to a corresponding SS set, where the SS set includes at least one SS.

(7) A control resource set CORESET.

Optionally, the CORESET belongs to a corresponding CORESET set, where the CORESET set includes at least one CORESET, for example, CORESET #0, or the like.

(8) A bandwidth part BWP.

Optionally, the BWP belongs to a corresponding BWP set, where the BWP set includes at least one BWP.

Optionally, in the method for monitoring a physical downlink control channel according to this embodiment of this application, the foregoing first object includes two or more than two of the foregoing (1) to (8).

It is to be noted that, for the terminal device, at least two CDRX processes are configured respectively for at least two (groups of) DCI formats, where at least one parameter has a different value in the two CDRX processes; at least two CDRX processes are configured respectively for at least two (groups of) RNTIs, where at least one parameter has a different value in the two CDRX processes; at least two CDRX processes are configured respectively for at least two (groups of) search spaces, where at least one parameter has a different value in the two CDRX processes; at least two CDRX processes are configured respectively for at least two (groups of) CORESETs, where at least one parameter has a different value in the two CDRX processes; and at least two CDRX processes are configured respectively for at least two (groups of) BWPs, where at least one parameter has a different value in the two CDRX processes.

In this embodiment of this application, through setting at least two different search space groups for any one of different objects, for example, at least setting the first search space group and the second search space group for the first object in the plurality of the target objects, where the plurality of target objects may be different objects of a same type or different objects of different types, and then switching may be performed from monitoring a first PDCCH associated with the first object according to the first search space group corresponding to the first object to monitoring the first PDCCH associated with the first object according to the second search space group corresponding to the first object in a case that a preset condition, that is, the first triggering condition, is met. In this way, the PDCCHs associated with different objects may be monitored based on at least two different search space group configurations respectively corresponding to different objects to avoid unnecessary PDCCH blind detection and avoid wasting electricity by the terminal device, so as to reduce power consumption of the terminal.

Optionally, in the method for monitoring a physical downlink control channel according to this embodiment of this application, the foregoing first triggering condition includes one of the following:

(1) The first PDCCH being received. The scheme of switching a search space group corresponding to the first object when a first PDCCH is received may be understood as that the switching of the search space group corresponding to the first object is implicitly triggered through receiving the first PDCCH.

(2) A target PDCCH being received, where DCI of the target PDCCH carries a bit indicating that the terminal device switches from the first search space group to the second search space group. The scheme of switching a search space group corresponding to the first object when a target PDCCH carrying a bit indicating that the terminal device switches a search space group corresponding to the first object is received may be understood as that the switching of the search space group corresponding to the first object is explicitly triggered through receiving the foregoing bit carried in the target PDCCH.

(3) A first timer expiring, where the first timer is started after the first search space group takes effect, the first timer is restarted in a case that the first PDCCH is received, and the first timer continues to run in a case that the first PDCCH is not received.

The following description is made with an example that the user equipment UE maintaining the following parameters: the first object is a DCI format 0_1, the corresponding first search space group is an SS group 1, and the second search space group is an SS group 2; and the second object is a DCI format 1_1, the corresponding first search space group is an SS group 1, and the second search space group is an SS group 2. Then a triggering condition for switching different SS groups may be as follows.

In an example, when receiving a specified DCI format, for example, a DCI format 0_1, the UE switches from an SS group 1 for DCI format 0_1 to an SS group 2 for DCI format 0_1 (that is, in this case, the SS group 1 may be stopped, and the SS group 2 may be activated), where the SS group 1 for DCI format 0_1 and the SS group 2 for DCI format 0_1 may be preconfigured by a network side device (for example, a base station). When receiving a specified DCI format, for example, a DCI format 1_1, the UE switches from an SS group 1 for DCI format 1_1 to an SS group 2 for DCI format 1_1 (that is, in this case, the SS group 1 may be stopped, and the SS group 2 may be activated), where the SS group 1 for DCI format 1_1 and the SS group 2 for DCI format 1_1 may be preconfigured by a network side device (for example, a base station).

In another example, after the UE switches to the SS group 2 for DCI format 0_1, a timer 1 is started and counted down, and the timer counts once (timer 1 is reduced one) when the DCI format in a specified format, for example, the DCI format 0_1, is not received; the timer 1 is restarted when the DCI format in a specified format, for example, the DCI format 0_1, is received; and the UE switches to the SS group 1 for DCI format 0_1 when the timer 1 expires. After the UE switches to the SS group 2 for DCI format 1_1, a timer 2 is started and counted down, and the timer 2 counts once (the timer 2 is reduced one) when the DCI format in a specified format, for example, the DCI format 1_1, is not received; the timer 2 is restarted when the DCI format in a specified format, for example, the DCI format 1_1, is received; and the UE switches to the SS group 1 for DCI format 1_1 when the timer 2 expires.

Optionally, in the method for monitoring a physical downlink control channel according to this embodiment of this application, the following contents may be further included: the terminal device stops monitoring the first PDCCH according to the first search space group corresponding to the first object in a case that the first triggering condition is met. That is to say, in a case that the first triggering condition is met, the first PDCCH i s no longer monitored according to the first search space group corresponding to the first object.

It is to be noted that, the method for monitoring a physical downlink control channel performed by the terminal device according to the embodiments of this application may be performed by an apparatus for monitoring a physical downlink control channel, or, a control module configured to perform the method for monitoring a physical downlink control channel in the apparatus for monitoring a physical downlink control channel. In an embodiment of this application, that the apparatus for monitoring a physical downlink control channel performs the method for monitoring a physical downlink control channel is taken as an example for description of the apparatus for monitoring a physical downlink control channel according to this embodiment of this application.

Referring to FIG. 4, an embodiment of this application provides an apparatus 400 for monitoring a physical downlink control channel, applied to a terminal device and including: a receiving module 401 and a processing module 403.

The receiving module 401 is configured to receive configuration information, where the configuration information includes a plurality of groups of connected mode discontinuous reception CDRX parameters, and the plurality of groups of CDRX parameters correspond to a plurality of target objects. The processing module 403 is configured to monitor, according to a first group of CDRX parameters corresponding to a first object in the configuration information, a physical downlink control channel PDCCH associated with the first object, where the first object is one of the plurality of target objects, and the plurality of target objects include at least one of: a downlink control information DCI format; an uplink grant; a downlink grant; a DCI format having a preset DCI size; a radio network temporary identifier RNTI; a search space; a control resource set; or a bandwidth part.

Optionally, in the apparatus 400 for monitoring a physical downlink control channel according to this embodiment of this application, the CDRX parameters include at least one of: a CDRX-on duration timer or a CDRX-inactivity timer.

Optionally, in the apparatus 400 for monitoring a physical downlink control channel according to this embodiment of this application, any one of the plurality of groups of CDRX parameters includes at least one of: a CDRX-on duration timer or a CDRX-inactivity timer.

Optionally, in the apparatus 400 for monitoring a physical downlink control channel according to this embodiment of this application, the foregoing processing module 403 may be further configured to start or restart a CDRX-inactivity timer corresponding to the first object in a case that a newly transmitted PDCCH associated with the first object is received during running of a CDRX-on duration timer corresponding to the first object.

Optionally, in the apparatus 400 for monitoring a physical downlink control channel according to this embodiment of this application, the foregoing processing module 403 may be further configured to skip starting or restarting the CDRX-inactivity timer corresponding to the first object in a case that a PDCCH different from the PDCCH associated with the first object is received during running of the CDRX-on duration timer corresponding to the first object.

Optionally, in the apparatus 400 for monitoring a physical downlink control channel according to this embodiment of this application, a DCI format corresponding to the foregoing uplink grant includes at least one of: a DCI format 0_1, a DCI format 0_2, or a DCI format 0_0.

Optionally, in the apparatus 400 for monitoring a physical downlink control channel according to this embodiment of this application, a DCI format corresponding to the foregoing downlink grant includes at least one of: a DCI format 1_1, a DCI format 1_2, or a DCI format 1_0.

Optionally, in the apparatus 400 for monitoring a physical downlink control channel according to this embodiment of this application, the CDRX-inactivity timer corresponding to the first object is run continuously in a case that the PDCCH associated with the first object is not received within a target time unit during running of the CDRX-on duration timer corresponding to the first object.

Optionally, the apparatus 400 for monitoring a physical downlink control channel according to this embodiment of this application may further include: a first determining module, configured to determine to enter a DRX inactive period corresponding to the first object in a case that the CDRX-on duration timer corresponding to the first object is not running and the CDRX-inactivity timer corresponding to the first object expires.

Optionally, the apparatus 400 for monitoring a physical downlink control channel according to this embodiment of this application may further include: a second determining module, configured to determine to enter a DRX active period in a case that a CDRX-on duration timer or CDRX-inactivity timer corresponding to any one of the target objects is started.

Optionally, in the apparatus 400 for monitoring a physical downlink control channel according to this embodiment of this application, the foregoing receiving module may be further configured to receive a wake-up signal before the processing module monitors, according to the first group of CDRX parameters corresponding to the first object in the configuration information, the physical downlink control channel PDCCH associated with the first object, where the wake-up signal is used for indicating one of: whether to monitor a PDCCH during running of all CDRX-on duration timers corresponding to the plurality of groups of CDRX parameters, where the wake-up signal is associated with the plurality of groups of CDRX parameters; or whether to monitor a PDCCH during running of a CDRX-on duration timer corresponding to a first group of CDRX parameters in the plurality of groups of CDRX parameters, where the wake-up signal is associated with the first group of CDRX parameters.

In the embodiments of this application, based on the received configuration information, different connected mode discontinuous reception CDRX parameters set for different objects may be obtained, that is, a corresponding relationship between the plurality of groups of CDRX parameters and the plurality of target objects may be indicated through the configuration information, where the plurality of target objects may be different objects of a same type or different objects of different types, so that the associated PDCCH may be monitored according to the CDRX parameters corresponding to the different objects respectively. In this way, the PDCCHs associated with different objects may be monitored based on different CDRX parameter configurations according to different monitoring modes to avoid unnecessary PDCCH blind detection and avoid wasting electricity by the terminal device, so as to reduce power consumption of the terminal.

The apparatus for monitoring a physical downlink control channel in this embodiment of this application may be an apparatus, or may be a component, an integrated circuit, or a chip in a terminal device. The apparatus may be a mobile terminal or may be a non-mobile terminal. Exemplarily, the mobile terminal may include but is not limited to the category of the terminal 11 listed above. The non-mobile terminal may be a server, a network attached storage (NAS), a personal computer (PC), a television (TV), a teller machine, a self-service machine, or the like, which is not limited in this embodiment of this application.

The apparatus for monitoring a physical downlink control channel in this embodiment of this application may be an apparatus with an operating system. The operating system may be an Android operating system, an ios operating system, or another possible operating system, which is not limited in this embodiment of this application.

The apparatus for monitoring a physical downlink control channel according to this embodiment of this application can implement all processes implemented by the method embodiments shown in FIG. 2, and the same beneficial effects can be achieved. Details are not described herein again to avoid repetition.

It is to be noted that, the method for monitoring a physical downlink control channel performed by the terminal device according to the embodiments of this application may be performed by an apparatus for monitoring a physical downlink control channel, or a control module configured to perform the method for monitoring a physical downlink control channel in the apparatus for monitoring a physical downlink control channel. In an embodiment of this application, that the apparatus for monitoring a physical downlink control channel performs the method for monitoring a physical downlink control channel is taken as an example for description of the apparatus for monitoring a physical downlink control channel according to this embodiment of this application.

Referring to FIG. 5, an embodiment of this application provides an apparatus 500 for monitoring a physical downlink control channel, applied to a terminal device and including: a switching module 501 and a processing module 503.

The switching module 501 is configured to switch from a first search space group corresponding to a first object to a second search space group corresponding to the first object in a case that a first triggering condition is met, where the first object is one of the plurality of target objects, and the plurality of target objects correspond to at least two search space groups. The processing module 503 is configured to monitor a first PDCCH associated with the first object according to the second search space group, where the plurality of target objects include at least one of: a downlink control information DCI format; an uplink grant; a downlink grant; a DCI format having a preset DCI size; a radio network temporary identifier RNTI; a search space; a control resource set; or a bandwidth part.

Optionally, in the apparatus 500 for monitoring a physical downlink control channel according to this embodiment of this application, the foregoing processing module 503 may be further configured to, in a case that a first triggering condition is met, stop monitoring the first PDCCH according to the first search space group.

Optionally, in the apparatus 500 for monitoring a physical downlink control channel according to this embodiment of this application, a DCI format corresponding to the foregoing uplink grant includes at least one of: a DCI format 0_1, a DCI format 0_2, or a DCI format 0_0.

Optionally, in the apparatus 500 for monitoring a physical downlink control channel according to this embodiment of this application, a DCI format corresponding to the foregoing downlink grant includes at least one of: a DCI format 1_1, a DCI format 1_2, or a DCI format 1_0.

Optionally, in the apparatus 500 for monitoring a physical downlink control channel according to this embodiment of this application, the foregoing first triggering condition includes one of: the first PDCCH being received; a target PDCCH being received, where DCI of the target PDCCH carries a bit indicating that the terminal device switches from the first search space group to the second search space group; or a first timer expiring, where the first timer is started after the first search space group takes effect, the first timer is restarted in a case that the first PDCCH is received, and the first timer continues to run in a case that the first PDCCH is not received.

In this embodiment of this application, through setting at least two different search space groups for any one of different objects, for example, at least setting the first search space group and the second search space group for the first object in the plurality of the target objects, where the plurality of target objects may be different objects of a same type or different objects of different types, and then switching may be performed from monitoring a first PDCCH associated with the first object according to the first search space group corresponding to the first object to monitoring the first PDCCH associated with the first object according to the second search space group corresponding to the first object in a case that a preset condition, that is, the first triggering condition, is met. In this way, the PDCCHs associated with different objects may be monitored based on at least two different search space group configurations respectively corresponding to different objects to avoid unnecessary PDCCH blind detection and avoid wasting electricity by the terminal device, so as to reduce power consumption of the terminal.

The apparatus for monitoring a physical downlink control channel in this embodiment of this application may be an apparatus, or may be a component, an integrated circuit, or a chip in a terminal device. The apparatus may be a mobile terminal or may be a non-mobile terminal. Exemplarily, the mobile terminal may include but is not limited to the category of the terminal 11 listed above. The non-mobile terminal may be a server, a network attached storage (NAS), a personal computer (PC), a television (TV), a teller machine, a self-service machine, or the like, which is not limited in this embodiment of this application.

The apparatus for monitoring a physical downlink control channel in this embodiment of this application may be an apparatus with an operating system. The operating system may be an Android operating system, an ios operating system, or another possible operating system, which is not limited in this embodiment of this application.

The apparatus for monitoring a physical downlink control channel according to this embodiment of this application can implement all processes implemented by the method embodiments shown in FIG. 3, and the same beneficial effects can be achieved. Details are not described herein again to avoid repetition.

Figure 6:
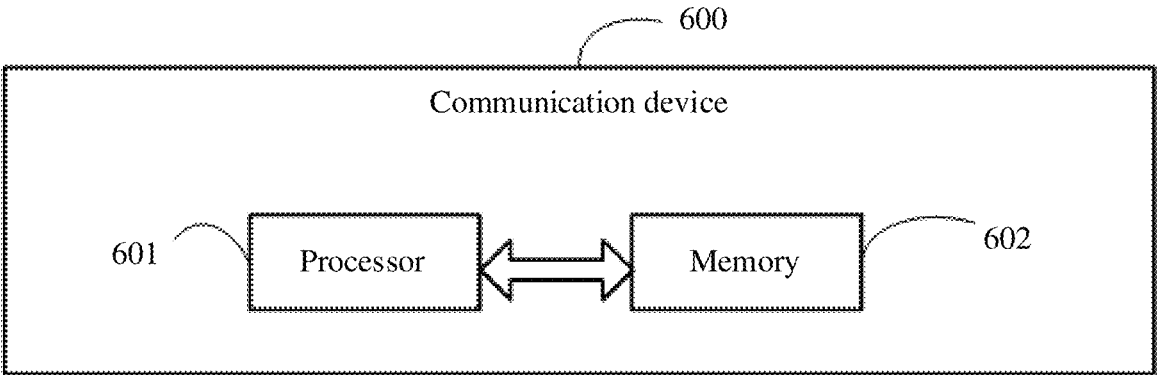
FIG. 6 is a schematic structural diagram of a communication device according to an embodiment of this application.

Optionally, as shown in FIG. 6, the embodiments of this application further provide a communication device 600, including a processor 601, a memory 602, and a program or an instruction stored in the memory 602 and executable on the processor 601. For example, when the communication device 600 is a terminal, when the program or instruction is executed by the processor 601, each process of the foregoing method embodiments for monitoring a physical downlink control channel corresponding to FIG. 2 is implemented, and the same technical effects can be achieved; or when the program or instruction is executed by the processor 601, each process of the foregoing method embodiments for monitoring a physical downlink control channel corresponding to FIG. 3 is implemented, and the same technical effects can be achieved, which will not be described in detail herein again to avoid repetition.

Figure 7:
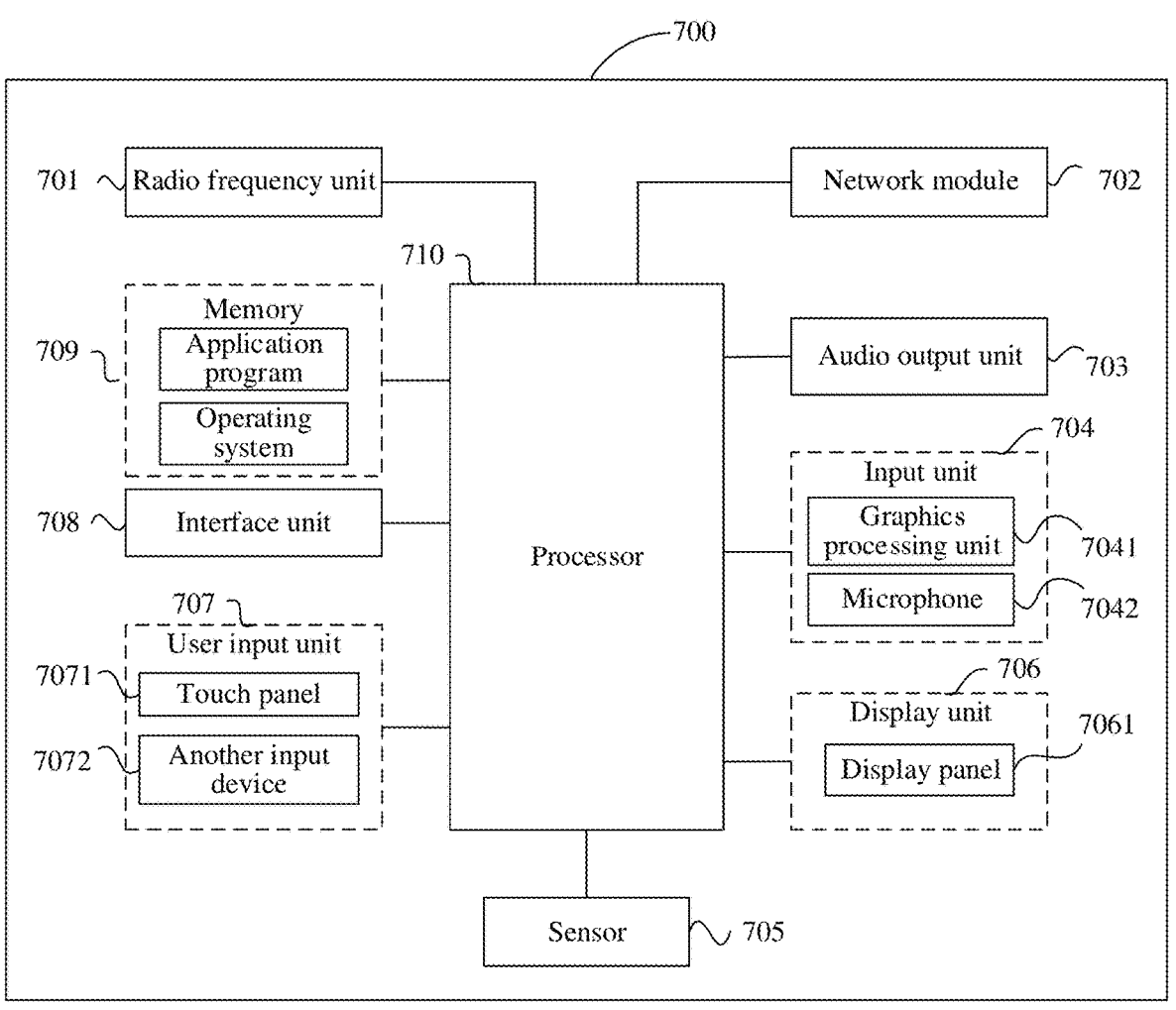
FIG. 7 is a schematic structural diagram of a terminal device according to an embodiment of this application.

FIG. 7 is a schematic diagram of a hardware structure of a terminal for implementing the embodiments of this application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (such as a battery) for supplying power to the components. The power supply may be logically connected to the processor 710 by using a power management system, thereby implementing functions such as charging, discharging, and power consumption management by using the power management system. A terminal structure shown in FIG. 7 constitutes no limitation on the terminal, and the terminal may include more or fewer components than those shown in the figure, or some components may be combined, or a different component deployment may be used, which are not described herein again.

It is to be understood that, in this embodiment of this application, the input unit 704 may include a graphics processing unit (GPU) 7041 and a microphone 7042, and the graphics processing unit 7041 processes static pictures or video image data obtained by an image capturing device (such as a camera) in a video capturing mode or an image capturing mode. The display unit 706 may include a display panel 7061, and the display panel 7061 may be configured by using a liquid crystal display, an organic light-emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include, but is not limited to, a physical keyboard, a functional key (such as a volume control key or a switch key), a track ball, a mouse, and a joystick, which are not described herein again.

In this embodiment of this application, the radio frequency unit 701 receives downlink data from a network side device and transmits the downlink data to the processor 710 for processing; and in addition, transmits uplink data to the network side device. Generally, the radio frequency unit 701 includes, but is not limited to, an antenna, at least one amplifier, a transceiver, a coupler, a low noise amplifier, a duplexer, and the like.

The memory 709 may be configured to store a software program or instruction and various data. The memory 709 may mainly include a program or instruction storage area and a data storage area. The program or instruction storage area may store an operating system, an application program or instruction required by at least one function (for example, a sound playback function and an image display function), and the like. In addition, the memory 709 may include a high speed random access memory, and may further include a non-volatile memory, where the non-volatile memory may be a read-only memory (ROM), a programmable ROM (PROM), an erasable PROM (EPROM), an electrically EPROM (EEPROM), or a flash memory. For example, at least one magnetic disk storage device, a flash memory or another volatile solid-state storage device.

The processor 710 may include one or more processing units. Optionally, the processor 710 may integrate an application processor and a modem processor, where the application processor mainly processes an operating system, a user interface, an application program or instruction, and the like, and the modem processor mainly processes wireless communication, for example, a base band processor. It may be understood that the foregoing modem processor may either not be integrated into the processor 710.

The processor 710 may at least be configured to implement at least one of the following of the method for monitoring a physical downlink control channel: optionally, in an embodiment, the radio frequency unit 701 is configured to receive configuration information, where the configuration information includes a plurality of groups of connected mode discontinuous reception CDRX parameters, and the plurality of groups of CDRX parameters correspond to a plurality of target objects; and the processor 710 is configured to monitor, according to a first group of CDRX parameters corresponding to a first object in the configuration information, a physical downlink control channel PDCCH associated with the first object, where the first object is one of the plurality of target objects, and the plurality of target objects include at least one of: a downlink control information DCI format; an uplink grant; a downlink grant; a DCI format having a preset DCI size; a radio network temporary identifier RNTI; a search space; a control resource set; or a bandwidth part.

In the embodiments of this application, based on the received configuration information, different connected mode discontinuous reception CDRX parameters set for different objects may be obtained, that is, a corresponding relationship between the plurality of groups of CDRX parameters and the plurality of target objects may be indicated through the configuration information, where the plurality of target objects may be different objects of a same type or different objects of different types, so that the associated PDCCH may be monitored according to the CDRX parameters corresponding to the different objects respectively. In this way, the PDCCHs associated with different objects may be monitored based on different CDRX parameter configurations according to different monitoring modes to avoid unnecessary PDCCH blind detection and avoid wasting electricity by the terminal device, so as to reduce power consumption of the terminal.

Optionally, in another embodiment, the processor 710 is configured to switch from a first search space group corresponding to a first object to a second search space group corresponding to the first object in a case that a first triggering condition is met, where the first object is one of the plurality of target objects, and the plurality of target objects correspond to at least two search space groups; and monitor a first PDCCH associated with the first object according to the second search space group, where the plurality of target objects include at least one of: a downlink control information DCI format; an uplink grant; a downlink grant; a DCI format having a preset DCI size; a radio network temporary identifier RNTI; a search space; a control resource set; or a bandwidth part.

In this embodiment of this application, through setting at least two different search space groups for any one of different objects, for example, at least setting the first search space group and the second search space group for the first object in the plurality of the target objects, where the plurality of target objects may be different objects of a same type or different objects of different types, and then switching may be performed from monitoring a first PDCCH associated with the first object according to the first search space group corresponding to the first object to monitoring the first PDCCH associated with the first object according to the second search space group corresponding to the first object in a case that a preset condition, that is, the first triggering condition, is met. In this way, the PDCCHs associated with different objects may be monitored based on at least two different search space group configurations respectively corresponding to different objects to avoid unnecessary PDCCH blind detection and avoid wasting electricity by the terminal device, so as to reduce power consumption of the terminal.

The embodiments of this application further provide a non-transitory computer-readable storage medium, storing a program or an instruction, where when the program or instruction is executed by a processor, each process of the foregoing method embodiments for monitoring a physical downlink control channel is implemented, and the same technical effect can be achieved, which is not described in detail herein again to avoid repetition.

The processor is the processor in the terminal described in the above embodiment. The non-transitory computer-readable storage medium includes a read-only memory (ROM), a random access memory (RAM), a magnetic disk, or an optical disk.

The embodiments of this application further provide a computer program product, including a processor, a memory, and a program or an instruction stored in the memory and executable on the processor, where when the program or instruction is executed by the processor, each process of the foregoing method embodiments for monitoring a physical downlink control channel is implemented, and the same technical effects can be achieved. To avoid repetition, details are not described herein again.

The embodiments of this application further provide a chip, including a processor and a communication interface, where the communication interface is coupled to the processor, the processor is configured to execute a program or an instruction of a terminal device to implement each process of the foregoing method embodiments for monitoring a physical downlink control channel, and the same technical effects can be achieved. To avoid repetition, details are not described herein again.

It is to be understood that the chip mentioned in this embodiment of this application may also be referred to as a system-level chip, a system chip, a chip system, a system chip on a chip, or the like.

It is to be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by a sentence "including one" does not exclude that there are still other same elements in the process, method, object, or apparatus. In addition, it is to be noted that, the scope of the method and apparatus in the embodiments of this application is not limited to performing the functions in the order shown or discussed, but may also include performing the functions in a substantially simultaneous manner or in a reverse order according to the functions involved, for example, the described method may be performed in a sequence different from the described order, and various steps may also be added, omitted, or combined. In addition, features described with reference to certain examples may be combined in other examples.

Through the descriptions of the foregoing implementations, a person skilled in the art may clearly understand that the method according to the foregoing embodiments may be implemented by means of software and a necessary general hardware platform, and certainly, may also be implemented by hardware. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. A method for monitoring a physical downlink control channel, comprising:

receiving, by a terminal device, configuration information, wherein the configuration information comprises a plurality of groups of connected mode discontinuous reception (CDRX) parameters, and the plurality of groups of CDRX parameters correspond to a plurality of target objects; and monitoring, by the terminal device, according to a first group of CDRX parameters corresponding to a first object in the configuration information, a physical downlink control channel (PDCCH) associated with the first object, wherein the first object is one of the plurality of target objects, and the plurality of target objects comprise at least one of:

a downlink control information (DCI) format;

an uplink grant;

a downlink grant;

a DCI format having a preset DCI size;

a radio network temporary identifier (RNTI);

a search space;

a control resource set; or a bandwidth part;

wherein the CDRX parameters comprise at least one of: a CDRX-on duration timer or a CDRX-inactivity timer; and the method further comprises:

starting or restarting, by the terminal device, a CDRX-inactivity timer corresponding to the first object in a case that a newly transmitted PDCCH associated with the first object is received during running of a CDRX-on duration timer corresponding to the first object; and skipping starting or restarting, by the terminal device, the CDRX-inactivity timer corresponding to the first object in a case that a PDCCH that is different from the PDCCH associated with the first object is received during running of the CDRX-on duration timer corresponding to the first object.

2. The method according to claim 1, wherein a DCI format corresponding to the uplink grant comprises at least one of: a DCI format 0_1, a DCI format 0_2, or a DCI format 0_0; and/or a DCI format corresponding to the downlink grant comprises at least one of: a DCI format 1_1, a DCI format 1_2, or a DCI format 1_0.

3. The method according to claim 1, further comprising:

continuing, by the terminal device, to run the CDRX-inactivity timer corresponding to the first object in a case that the PDCCH associated with the first object is not received within a target time unit during running of the CDRX-inactivity timer corresponding to the first object.

4. The method according to claim 1, further comprising:

determining, by the terminal device, to enter a discontinuous reception (DRX) inactive period corresponding to the first object in a case that the CDRX-on duration timer corresponding to the first object is not running and the CDRX-inactivity timer corresponding to the first object expires.

5. The method according to claim 1, further comprising:

determining, by the terminal device, to enter a discontinuous reception (DRX) active period in a case that a CDRX-on duration timer or CDRX-inactivity timer corresponding to any one of the target objects is started.

6. The method according to claim 1, wherein before the monitoring, by the terminal device, according to a first group of CDRX parameters corresponding to a first object in the configuration information, a physical downlink control channel (PDCCH) associated with the first object, the method further comprises:

receiving, by the terminal device, a wake-up signal, wherein the wake-up signal is used for indicating one of:

whether to monitor a PDCCH during running of all CDRX-on duration timers corresponding to the plurality of groups of CDRX parameters, wherein the wake-up signal is associated with the plurality of groups of CDRX parameters; or whether to monitor a PDCCH during running of a CDRX-on duration timer corresponding to a first group of CDRX parameters in the plurality of groups of CDRX parameters, wherein the wake-up signal is associated with the first group of CDRX parameters.

7. A terminal device, comprising a memory, a processor, and a program or an instruction stored in the memory and executable on the processor, wherein the program or instruction, when executed by the processor, causes the terminal device to perform:

receiving configuration information, wherein the configuration information comprises a plurality of groups of connected mode discontinuous reception (CDRX) parameters, and the plurality of groups of CDRX parameters correspond to a plurality of target objects; and monitoring, according to a first group of CDRX parameters corresponding to a first object in the configuration information, a physical downlink control channel (PDCCH) associated with the first object, wherein the first object is one of the plurality of target objects, and the plurality of target objects comprise at least one of:

a downlink control information (DCI) format;

an uplink grant;

a downlink grant;

a DCI format having a preset DCI size;

a radio network temporary identifier (RNTI);

a search space;

a control resource set; or a bandwidth part;

wherein the CDRX parameters comprise at least one of: a CDRX-on duration timer or a CDRX-inactivity timer; and the program or instruction, when executed by the processor, causes the terminal device to further perform:

starting or restarting a CDRX-inactivity timer corresponding to the first object in a case that a newly transmitted PDCCH associated with the first object is received during running of a CDRX-on duration timer corresponding to the first object; and skipping starting or restarting the CDRX-inactivity timer corresponding to the first object in a case that a PDCCH that is different from the PDCCH associated with the first object is received during running of the CDRX-on duration timer corresponding to the first object.

8. The terminal device according to claim 7, wherein the program or instruction, when executed by the processor, causes the terminal device to further perform:

continuing to run the CDRX-inactivity timer corresponding to the first object in a case that the PDCCH associated with the first object is not received within a target time unit during running of the CDRX-inactivity timer corresponding to the first object.

9. The terminal device according to claim 7, wherein the program or instruction, when executed by the processor, causes the terminal device to further perform:

determining to enter a discontinuous reception (DRX) inactive period corresponding to the first object in a case that the CDRX-on duration timer corresponding to the first object is not running and the CDRX-inactivity timer corresponding to the first object expires.

10. The terminal device according to claim 7, wherein the program or instruction, when executed by the processor, causes the terminal device to further perform:

determining to enter a discontinuous reception (DRX) active period in a case that a CDRX-on duration timer or CDRX-inactivity timer corresponding to any one of the target objects is started.

11. The terminal device according to claim 7, wherein the program or instruction, when executed by the processor, causes the terminal device to further perform:

receiving a wake-up signal, wherein the wake-up signal is used for indicating one of:

whether to monitor a PDCCH during running of all CDRX-on duration timers corresponding to the plurality of groups of CDRX parameters, wherein the wake-up signal is associated with the plurality of groups of CDRX parameters; or whether to monitor a PDCCH during running of a CDRX-on duration timer corresponding to a first group of CDRX parameters in the plurality of groups of CDRX parameters, wherein the wake-up signal is associated with the first group of CDRX parameters.

12. The terminal device according to claim 7, wherein a DCI format corresponding to the uplink grant comprises at least one of: a DCI format 0_1, a DCI format 0_2, or a DCI format 0_0; and/or a DCI format corresponding to the downlink grant comprises at least one of: a DCI format 1_1, a DCI format 1_2, or a DCI format 1_0.

13. A non-transitory readable storage medium storing a program or an instruction, wherein the program or the instruction, when executed by a processor of a terminal device, causes the terminal device to preform:

receiving configuration information, wherein the configuration information comprises a plurality of groups of connected mode discontinuous reception (CDRX) parameters, and the plurality of groups of CDRX parameters correspond to a plurality of target objects; and monitoring, according to a first group of CDRX parameters corresponding to a first object in the configuration information, a physical downlink control channel (PDCCH) associated with the first object, wherein the first object is one of the plurality of target objects, and the plurality of target objects comprise at least one of:

a downlink control information (DCI) format;

an uplink grant;

a downlink grant;

a DCI format having a preset DCI size;

a radio network temporary identifier (RNTI);

a search space;

a control resource set; or a bandwidth part;

wherein the CDRX parameters comprise at least one of:
   a CDRX-on duration timer or a CDRX-inactivity timer;
   and the program or instruction, when executed by the processor, causes the terminal device to further perform:

starting or restarting a CDRX-inactivity timer corresponding to the first object in a case that a newly transmitted PDCCH associated with the first object is received during running of a CDRX-on duration timer corresponding to the first object; and skipping starting or restarting the CDRX-inactivity timer corresponding to the first object in a case that a PDCCH that is different from the PDCCH associated with the first object is received during running of the CDRX-on duration timer corresponding to the first object.

14. The non-transitory readable storage medium according to claim 13, wherein the program or instruction, when executed by the processor, causes the terminal device to further perform:

continuing to run the CDRX-inactivity timer corresponding to the first object in a case that the PDCCH associated with the first object is not received within a target time unit during running of the CDRX-inactivity timer corresponding to the first object.

15. The non-transitory readable storage medium according to claim 13, wherein the program or instruction, when executed by the processor, causes the terminal device to further perform:

determining to enter a discontinuous reception (DRX) inactive period corresponding to the first object in a case that the CDRX-on duration timer corresponding to the first object is not running and the CDRX-inactivity timer corresponding to the first object expires.

16. The non-transitory readable storage medium according to claim 13, wherein the program or instruction, when executed by the processor, causes the terminal device to further perform:

determining to enter a discontinuous reception (DRX) active period in a case that a CDRX-on duration timer or CDRX-inactivity timer corresponding to any one of the target objects is started.

17. The non-transitory readable storage medium according to claim 13, wherein the program or instruction, when executed by the processor, causes the terminal device to further perform:

receiving a wake-up signal, wherein the wake-up signal is used for indicating one of:

whether to monitor a PDCCH during running of all CDRX-on duration timers corresponding to the plurality of groups of CDRX parameters, wherein the wake-up signal is associated with the plurality of groups of CDRX parameters; or whether to monitor a PDCCH during running of a CDRX-on duration timer corresponding to a first group of CDRX parameters in the plurality of groups of CDRX parameters, wherein the wake-up signal is associated with the first group of CDRX parameters.

18. The non-transitory readable storage medium according to claim 13, wherein a DCI format corresponding to the uplink grant comprises at least one of: a DCI format 0_1, a DCI format 0_2, or a DCI format 0_0; and/or a DCI format corresponding to the downlink grant comprises at least one of: a DCI format 1_1, a DCI format 1_2, or a DCI format 1_0.

* * * * *